United States Patent
Juntti et al.

(10) Patent No.: US 8,102,899 B2
(45) Date of Patent: Jan. 24, 2012

(54) RECEIVER AND METHOD OF RECEIVING A CDMA SIGNAL IN PRESENCE OF INTERFERENCES WITH UNKNOWN SPREADING FACTORS

(75) Inventors: Markku Juntti, Oulu (FI); Kari Horneman, Oulu (FI)

(73) Assignee: Intellectual Ventures I LLC, Wilmington, DE (US)

( * ) Notice: Subject to any disclaimer, the term of this patent is extended or adjusted under 35 U.S.C. 154(b) by 2066 days.

(21) Appl. No.: 10/332,040

(22) PCT Filed: May 28, 2001

(86) PCT No.: PCT/EP01/06045
§ 371 (c)(1),
(2), (4) Date: May 7, 2003

(87) PCT Pub. No.: WO02/03561
PCT Pub. Date: Jan. 10, 2002

(65) Prior Publication Data
US 2003/0179814 A1    Sep. 25, 2003

(30) Foreign Application Priority Data
Jul. 6, 2000 (GB) .................. 0016663.7

(51) Int. Cl.
*H04B 1/707* (2006.01)
(52) U.S. Cl. ......... 375/148; 375/149; 375/326; 375/335
(58) Field of Classification Search ............ 375/148, 375/144, 149, 346, 150, 147, 316, 347, 343, 375/349; 370/342, 208, 335; 455/296
See application file for complete search history.

(56) References Cited

U.S. PATENT DOCUMENTS

| | | | | |
|---|---|---|---|---|
| 5,325,394 A | * | 6/1994 | Bruckert ............... | 375/148 |
| 5,579,304 A | * | 11/1996 | Sugimoto et al. ......... | 370/342 |
| 5,598,428 A | * | 1/1997 | Sato ................. | 375/148 |
| 5,710,768 A | * | 1/1998 | Ziv et al. .............. | 370/342 |
| 6,070,086 A | * | 5/2000 | Dobrica ............... | 455/522 |

(Continued)

FOREIGN PATENT DOCUMENTS
WO    96/36132    11/1996

OTHER PUBLICATIONS

Caire, G.; Taricco, G.; Biglieri, E.; "Optimum power control over fading channels" Information Theory, IEEE Transactions on vol. 45, Issue 5, Jul. 1999 pp. 1468-1489.*

(Continued)

*Primary Examiner* — Khanh C Tran
*Assistant Examiner* — Qutbuddin Ghulamali

(57) ABSTRACT

A receiver arranged to receive a plurality of spread spectrum signals including a first spread spectrum signal from which interference caused by one or more others of said plurality of signals is to be removed, wherein at least one of said other spread spectrum signals has a spreading factor which is unknown to said receiver. The receiver comprises means for estimating a spreading factor of said at least one other spread spectrum signal having an unknown spreading factor, said estimating means selecting the spreading factor to be smallest possible spreading factor, means for despreading said at least one other spread spectrum signal using said estimated spreading factor, and means for estimating interference in the first spread spectrum signal caused by said at least one other spread spectrum signal.

35 Claims, 4 Drawing Sheets

U.S. PATENT DOCUMENTS

| | | | | |
|---|---|---|---|---|
| 6,219,376 | B1* | 4/2001 | Zhodzishsky et al. | 375/148 |
| 6,381,229 | B1* | 4/2002 | Narvinger et al. | 370/328 |
| 6,424,618 | B1* | 7/2002 | Uesugi et al. | 370/208 |
| 6,470,044 | B1* | 10/2002 | Kowalski | 375/148 |
| 6,574,270 | B1* | 6/2003 | Madkour et al. | 375/148 |
| 6,643,275 | B1* | 11/2003 | Gustafsson et al. | 370/328 |
| 6,661,835 | B1* | 12/2003 | Sugimoto et al. | 375/148 |
| 6,804,307 | B1* | 10/2004 | Popovic | 375/299 |
| 6,839,378 | B1* | 1/2005 | Sourour et al. | 375/142 |
| 6,912,250 | B1* | 6/2005 | Adireddy et al. | 375/232 |
| 6,920,173 | B2* | 7/2005 | Nakamura et al. | 375/148 |
| 6,940,894 | B2* | 9/2005 | Sendonaris | 375/140 |
| 7,257,156 | B2* | 8/2007 | Lakkis | 375/233 |
| 2001/0046205 | A1* | 11/2001 | Easton et al. | 370/209 |
| 2003/0002568 | A1* | 1/2003 | Dabak et al. | 375/148 |
| 2004/0086065 | A1* | 5/2004 | Dabak et al. | 375/347 |

OTHER PUBLICATIONS

Torlak, M.; Guanghan Xu; "Performance of CDMA smart antenna systems" Signals, Systems and Computers, 1995, Conference Record of the Twenty-Ninth Asilomar Conference on vol. 1, Oct. 30-Nov. 2, 1995 pp. 383-387.*

Madkour, M.F., et al "A Novel Downlink Blind Interference Cancellation in a W-CDMA Mobile Communication System", Electrical Engineering Dept., IEEE, 1999.*

Hwang, S.H. et al., "Interference Cancellation Schemes for a Dual-Rate Variable Processing Gain DS/CDMA System," IEEE International Conference on Universal Personal Communications, U.S., New York, IEE, vol. CONF. 6, Oct. 12, 1997, pp. 465-469, XP00077866.

Madkour, M.F., et al., "A Subspace Projection Based Blind Interference Cancellation Scheme for W-CDMA Downlink," Conference Record of the Thirty-Third ASILOMAR Conference on Signals, Systems and Computers, (Cat. No. CH37020), Proceedings of 1999 ASILOMAR Conference, Pacific Grove, CA, USA, Oct. 24-27, 1999, pp. 1611-1615, vol. 2, Xp002180037 199, Piscataway, NJ, USA, IEEE USA.

* cited by examiner

RECEIVER AND METHOD OF RECEIVING A CDMA SIGNAL IN PRESENCE OF INTERFERENCES WITH UNKNOWN SPREADING FACTORS

FIELD OF THE INVENTION

The present invention relates to a method of receiving and a receiver.

BACKGROUND OF THE INVENTION

In a communication system, data is transmitted as a plurality of data symbols in data or radio frames. The signals carrying the data may be transmitted with variable data symbol transmission rates (data speeds) and in some arrangements the transmission rate can be different in diffecent frames of the transmission. For example, in a cellular CDMA (code division multiple access) system data is encoded for transmission by processing data symbols to be transmitted by a spreading code for each transmission channel. The effect of a spreading code is to spread the frequency band of a transmission to a chip rate which la larger than the actual data or information symbol rate. This results in more symbols being transmitted than the actual number of information symbols. For example, if the used spreading factor is 8, 8 symbols (referred to as "chips") are transmitted for every information symbol. It has been proposed that the number of "chips" per data symbol be defined by a spreading factor. The length of the spreading code may however be longer or shorter than the information symbol time. The spreading factor is sometimes expressed by a definition the following ratios of chip rate: data symbol rate or data symbol duration: chip duration where the data symbol duration equals 1: data symbol rate and the chip duration equals 1: chip rate. The terra spreading factor will be used in this document although other terms such as spreading ratio or processing gain may sometimes also be used in this context.

It is possible to set up a variable rate (multi rate) connection where the data symbol rate of the information symbols or bits, and thus the spreading code used in the spreading modulation of the symbols, may vary from frame to frame. The data rates used in such a connection are not arbitrary, but for each frame duration one of the plurality of predefined data rates is used.

Information on the spreading factor used will not necessarily be known by a receiver. The receiver can carry out a process in which the spreading factor is determined. The spreading factor needs to be known in order to correctly process the received data.

In CDMA systems, multi access interference (MAI) is usually present. In a CDMA system, a relatively large number of users will use the same frequency band. The users are distinguished by different scrambling or spreading codes. The terms "scrambling code" and "spreading code" are used the same sense as in the 3GPP specification (see 3G TS 25.213, V3.2.0, $3^{rd}$ Generation Partnership Project; Technical Specification Group Radio Access Network; Spreading and modulation (FDD), Release 1999, page 7). However, interference to a given user will be caused by the other users who use the same frequency. To suppress interference caused by other users, multi user detection (MUD) or interference cancellation (IC) receivers have been proposed. These receivers jointly detect the data symbols of users. The multi user detection or interference cancellation is performed at the base band frequency. This joint detection is currently assumed only to be possible if the spreading factors for all of the users are known. Accordingly, it has been assumed that if one of the users has an unknown spreading factor it is not possible to use multi user detection or interference cancellation techniques.

SUMMARY OF THE INVENTION

It is an aim of embodiments of the present invention to provide an arrangement where the effects of multi access interference can be removed, even when the spreading factor is unknown.

According to one aspect of the present invention there is provided a receiver arranged to receive a plurality of spread spectrum signals including a first spread spectrum signal from which interference caused by one or more others of said plurality of signals is to be removed, wherein at least one of said other spread spectrum signals has a spreading factor which is unknown to said receiver, said receiver comprising means for estimating a spreading factor of said at least one other spread spectrum signal having an unknown spreading factor, said estimating means selecting the spreading factor to be the smallest possible spreading factor; means for despreading said at least one other spread spectrum signal using said estimated spreading factor; and means for estimating interference in the first spread spectrum signal caused by said at least one other spread spectrum signal.

In preferred embodiments means are provided for using said estimated interference to at least partially cancel the interference caused by said at least one other spread spectrum signal. Typically such receivers have a first path and a second path for received signals, said first path being used for the at least one spread spectrum signal having a spreading factor which is unknown and said second path being used for each said signal of which the spreading factor is known. Switch means are provided for selecting said first path or said second path.

Preferably, the first path and said second path are connected to said means for estimating interference.

The first path may comprise said spreading factor estimating means and said despreading means.

Preferably said estimating means is provided with a plurality of estimates for said spreading factor and said estimating means is arranged to select the largest of said estimates.

Preferably a spreading factor detector in provided to determine the spreading factor. In which case, the spreading factor detector can be arranged to determine the spreading factor in a plurality of steps with the or each successive step being arranged to provide a more accurate determination of the spreading factor. The spreading factor determined in a preceding step may then be used as the spreading factor estimate by said estimating means.

In preferred embodiments, a plurality of different spreading factors are available and said estimating means selects the smallest spreading factor which can be used by the sender of said signals. The estimating means is arranged to select the smallest spreading factor possible for signals.

Preferably, the estimating means is arranged to select the minimum spreading factor allowed by the system for the particular signal received.

Receivers embodying the present invention may be used in a wireless communications system.

In such a case, said receiver may be incorporated in a base station and/or user equipment. Typically, said receiver could be arranged to receive code division multiple access signals.

According to a second aspect of the present invention there is provided a method for a receiver arranged to receive a plurality of spread spectrum signals including a first spread spectrum signal from which interference caused by one or more others of said plurality of signals is to be removed, wherein at least one of said other spread spectrum signals has a spreading factor which is unknown to said receiver, said method comprising estimating a spreading factor of said at least one other spread spectrum signal having an unknown spreading factor, said estimating means selecting the spreading factor to be the smallest possible spreading factor; despreading said at least one other spread spectrum signal using said estimated spreading factor; and estimating interference in the first spread spectrum signal caused by said at least one other spread spectrum signal.

Preferred methods comprise the step of using said estimated interference to at least partially cancel the interference caused by said at least one other signal.

BRIEF DESCRIPTION OF DRAWINGS

For a better understanding of the present invention and as to how the same may be carried into effect, reference will now be made by way of example to the accompanying drawings in which:—

DESCRIPTION OF PREFERRED EMBODIMENTS OF THE PRESENT INVENTION

Figure 1:
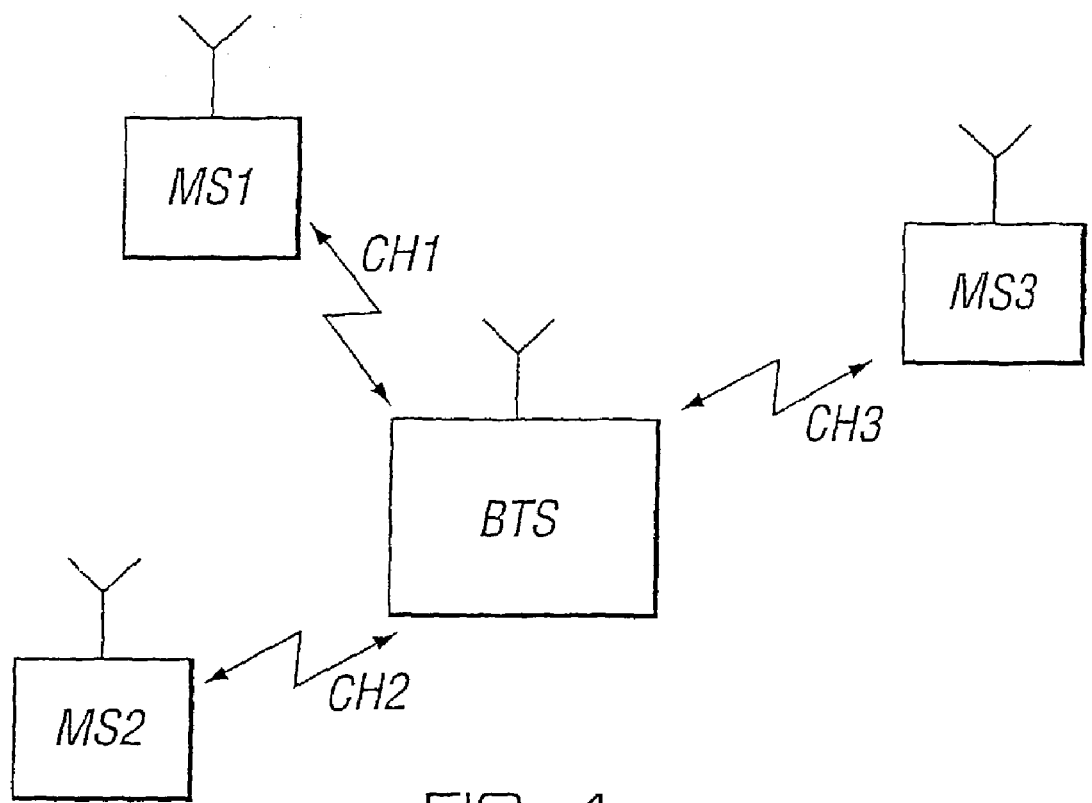
FIG. 1 is a block diagram of a mobile communications system.

FIG. 1 is a block diagram showing a context in which embodiments of the present invention may be used. In particular, FIG. 1 shows a CDMA mobile communication system that allows a plurality of mobile stations MS1, MS2, MS3 to communicate with a base transceiver station BTS in a common cell via respective channels CH1, CH2 and CH3. These channels are distinguished from one another by the use of scrambling codes in a manner which is known in the art. It should be appreciated that the area covered by a network is divided into a plurality of cells, each cell of which is served by a base station. In general, mobile stations are arranged to communicate with the base station of the cell in which the mobile station is located. However, the mobile station can communicate with more than one base station at the same time.

Embodiments of the present invention are described in the context of a code division multiple access system. In particular, embodiments of the present invention can be used in a wide band code division multiple access system. It should be appreciated that alternative embodiments of the present invention can be used in other types of code division multiple access systems or indeed any other type of spread spectrum system which uses spreading factors.

Figure 2:
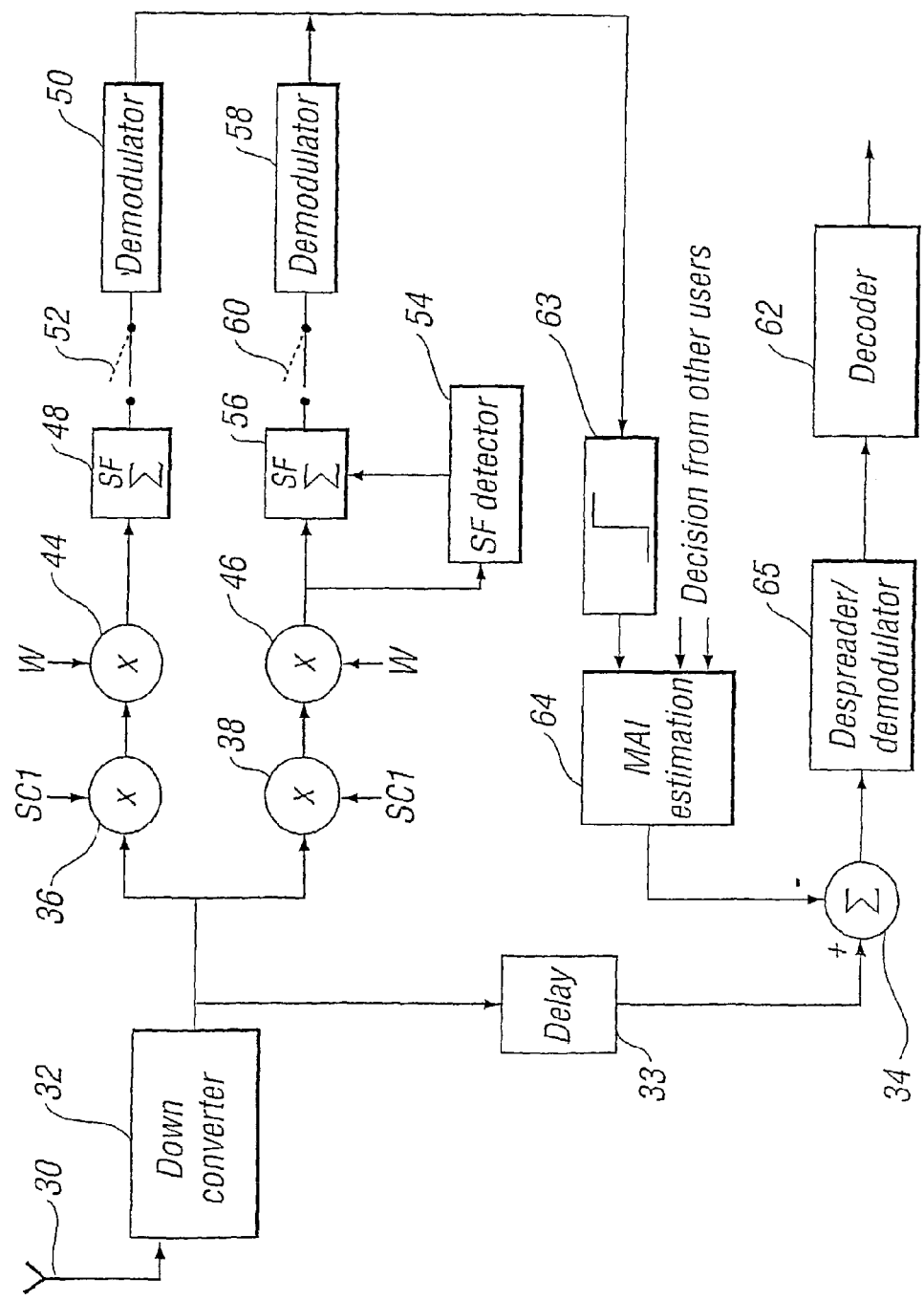
FIG. 2 shows a receiver embodying the present invention.

Reference is now made to FIG. 2 which shows a block diagram of receive circuitry in a base station in a CDMA system. The receive circuitry shown in FIG. 2 is for use in an uplink direction, that is for receiving signals from the mobile stations. It should be appreciated that in some embodiments of the present invention, the arrangement which will be described hereinafter can be implemented alternatively or additionally in the downlink direction, that is at the mobile station or the like.

Before describing the receiving circuitry shown in FIG. 2, an example of transmit circuitry (not shown) within a transmitting station will briefly be described. Data to be transmitted between a mobile station and a base transceiver station may be speech data, video data or other data. The data is encoded into a form suitable for transmission at a bit rate which is dependent on the source of the data. The encoded user data is typically supplied to a frame multiplexer. In some embodiments the user data may also be supplied to a CRC encoder which generates a check sequence for each frame of data. Error correction coding and bit interleaving of the frame sequence may be accomplished prior to the transmission in a manner known in the art. The error correction is used in order to protect the user data from errors in a radio channel so that for example the Viterbi decoder can recover the coded data even if some of the bits are corrupted. For error coding and decoding purposes, tail bits defining the end of each user data sequence may also be added to the end of user data sequence. Bit interleaving spread burst areas which typically occur in radio channels more evenly in time to allow the decoder to more efficiently correct the errors from the encoded data.

Figure 3:
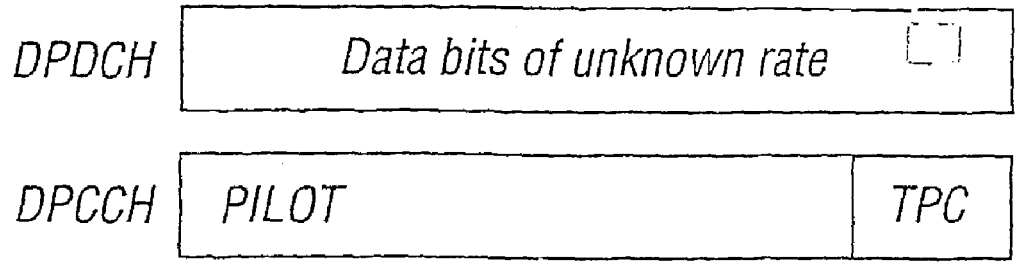
FIG. 3 shows a slot structure for physical channels for a transmission with an unknown data rate.

A frame multiplexer organises the data for transmission into a frame sequence. FIG. 3 illustrates an example of a slot structure for physical channels DPCCH (dedicated physical control channel) and DPDCH (dedicated physical data channel) in the frame sequence. The DPCCH part of the frame contains a pilot sequence (pilot), optional rate information (RI (not shown)) and a transmission power control TPC sequence. The DPDCH part of the frame contains the whole interleaved user data sequence which comprises user bits and possible CRC bits and possible tail bits. Typically, the user data of the DPDCH is divided into frame periods, such as periods of 10 ms. Each frame can be transmitted with a different rate. Thus, the transmitter is able to multiplex data from different sources into the frame sequence for transmission and to provide different transmission rates in different frames of the frame sequence.

The frame sequence is supplied to a spreader which receives spreading and possibly scrambling codes from a code generator. The spreading and possible scrambling codes may be generated in accordance with known CDMA techniques and will not be described in any further detail hereinafter. The effect of the spreading code is to spread the frequency band for transmission to a chip rate which is larger than the data symbol rate. If M parallel code channels are employed, M data symbols are spread using different spreading codes and then the results are summed together. The spread signal is then typically supplied to a modulator which modulates a signal ready for transmission, for example according to the QPSK modulation. In some systems, modulation may be carried out prior to spreading. This sequence of events, however, has no impact on embodiments of the present invention. The spread signal is then upconverted to a radio frequency for transmission.

The data rates used in a connection are not arbitrary but are set for their frame. Generally, a plurality of predefined data rates are set and one of those predefined data rates is used in a given frame. In preferred embodiments of the present invention, although not necessarily so, each higher data symbol rate may be dividable by a lower data symbol rate, the division factor being for example $2^k$ where k is greater than or equal to 0. This specification provides an example employing variable rate connection spreading factors of 4, 8, 16, 32, 64, 128 and 256 with corresponding data rates. However, it should be appreciated that in alternative embodiments of the present invention, other spreading factors and data rates can be used. To give an example of the possible relationship between the spreading factors and the data symbol rates, in a CDMA system with a chip rate of 4.096 MHz the relationship may be such that the spreading factors 4, 8, 16, 32, 64, 128 and 256 correspond to data rates 1024, 512, 256, 128, 624, 32 and 16 ksps (kilo symbols per second) respectively. However, the relationship between the spreading factors and the data rates may be different. For example, factors such as the number of code channels and the employed channel coding method and possible use of puncturing may influence the relationship between the end user bit rate and the spreading factor.

The reception of the spread spectrum signal will now be described with reference to FIG. 2. The received signal is received by an antenna 30 and is passed to a down converter 32 which down converts the received radio frequency signal to the base band frequency. It should be appreciated that other processing of the received signal may take place prior to down conversion. The signal which is received at the base station will generally have experienced multi path channels with different propagation delays. In other words, the same signal from a mobile station may take a number of different paths to the receiving antenna 30. The time taken to travel along those different paths can be different if the paths are of different lengths. This is dealt with by having a combiner (not shown) which receives and combines the signals travelling along the different paths.

The output of the downconverter 32 which is a base band signal is input to a first multiplier 36 and a second multiplier 38. Each of the first and second multipliers 36 and 38 receives a respective input SCI, SCI from a scrambling code generator. The received signal is mixed with the scrambling code SCI generated by the scrambling code generator in order to generate respective descrambled signals. The first multiplier is connected to a third multiplier 44. The descrambled signal provided by the first multiplier is input to the third multiplier 44. The third multiplier 44 receives a spreading code signal W at an input and is operable to despread the signal from the first multiplier 36. Likewise, the output of the second multiplier 38 is input to a fourth multiplier 46 which also receives the spreading code W as an input. The fourth multiplier 46 acts to despread the signal from the second multiplier 38.

The third multiplier 44 is input to a first spreading factor unit 48. This unit 48 is used in embodiments where the spreading factor is known. The spreading factor may be known for example from information transmitted to the base station or the like. The spreading factor unit 48 is output to a first demodulator 50. Using the spreading factor and/or data symbol rate, it is possible to accomplish a final despreading of the signal by the demodulator 50.

A switch 52 is provided between the first spreading factor unit 48 and the first demodulator 50. This switch will be open if the spreading factor is not known and closed if the spreading factor is known.

The output of the fourth multiplier 46 is input to a spreading factor detector 54. The spreading factor detector is arranged to detect the spreading factor used. An example of a spreading factor detector 54 will be described hereinafter. The spreading factor detector 54 has an output connected to a second spreading factor unit 56. The output of the fourth multiplier 46 is also connected to the second spreading factor unit 56.

The spreading factor unit 56 is arranged to select a spreading factor. If the spreading factor is unknown, the spreading factor unit 56 is arranged to select the lowest possible value. In particular, the spreading factor unit may select the maximum of the following:
 1. The minimum spreading factor allowed in a particular system. For example, the minimum spreading factor may be 4 in a wideband CDMA system.
 2. The minimum spreading factor allowed by the radio network controller for a particular data frame, if known by the receiver. There may be, for example, a minimum factor associated with the mobile station sending the signal.
 3. The minimum possible factor according to the spreading factor detector of the receiver. For example, the spreading factor detector 54 may be arranged to determine the spreading factor initially coarsely, very quickly, and then to continue to refine the value. The initial coarse value can be used as well as the subsequent refinements.

The signal containing the received signal and the spreading factor information is output by the second spreading factor unit 56 to a second demodulator 58. The demodulator 58 despreads the signal using the supplied spreading factor information. Again, a switch 60 is provided between the output of the second spreading factor unit 56 and the demodulator 58. This switch is closed when the spreading factor is unknown and open when the spreading factor is known. Accordingly, depending on whether or not the spreading factor is known, an output will be provided by either the first despreader 50 or the second demodulator 58.

The output of the first and second demodulators 50 and 58 are also input to a multiple access interference estimator (MAI) 64 via a hard decision device 63. The MAI unit 64 uses the output of the demodulators 50 or 58 in order to estimate the interference caused by other users. The output of the hard decision device is either +1 or −1, if input is ≧0 or <0 respectively).

The output of the down converter is also input to a summer 34 via a delay block 33. The summer 34 subtracts from the output of the down converter 32 the parts of the signal which are considered to have come from different users to the user in question. This provides a signal which has the components due to the other users removed. The output of the summer is substantially just the desired signal.

In other words, the multiple access interference estimator 64 removes the component due to the desired signal and outputs that to the summer 34. Accordingly, when the output of the down converter 32 is summed with the output of the multi access interference estimator, the effects of interference from other users can be at least partially removed.

The output of the summer 34 is supplied to a despreader/ demodulator 65 and output of the despreaders/demultiplexer 65 is input to a decoder 62. The decoder 62 may be a channel decoder or the like. The output signal may be processed further.

It should be appreciated that embodiments of the present invention can be used with any known multi user detector or interference cancellation receivers. Such receivers are well known in the art and various configurations embodying the present invention may be used.

Embodiments of the present invention, as described hereinbefore, permit the data symbols of users whose spreading factors are known to be detected as usual.

The data symbols of users whose spreading factor is unknown are detected by using the smallest possible spreading factor for that particular user. In other words, the users with the unknown spreading factor are treated in a similar way to users with a known spreading factor from the point of view of the multi user detection or interference cancellation receiver. In this way, successive data signals are not averaged in the correlator of the matched filter of the receiver. By using the smallest possible spreading factor the successive symbols are correctly despread even if the spreading factor used is the smallest. In the cases where the spreading factor used is larger than the smallest, then the used symbol can comprise several successive despread symbols.

As mentioned previously, the spreading factor detector can be operating in parallel for the users whose spreading factor is unknown. The spreading factor detector can either make directly the final decision on the spreading factor or it can step by step reduce the uncertainty in the spreading factor. The latter means that the spreading factor detector can decide first that the spreading factor is, for example, at least 8. In the second step it can decide that the spreading factor is at least 16 and in the third step it can decide that the spreading factor is at least 32 and so on. These decisions can then be immediately utilised by the despreader so as to improve the reliability of detection.

Embodiments of the present invention have the advantage that since the users with an unknown spreading factor are treated similarly to users with a known spreading factor, from the point of view of the multi user detection or interference cancellation receiver, the current designs for the multi user detection or interference cancellation receivers do not need to be changed.

Embodiments of the present invention mean that there is no detection delay due to the spreading factor detection. There is also no need to buffer the wideband spread spectrum signal due to the unknown spreading factor. The multi user detection or interference cancellation processing capacity may be more evenly distributed in time as it is non bursty. Thus, the baseband processing capacity requirements may decrease.

Whilst the decisions made with a lower spreading factor may be worse than those made with the true spreading factor, the degradation in performance is expected to be outweighed by the advantages.

Figure 4:
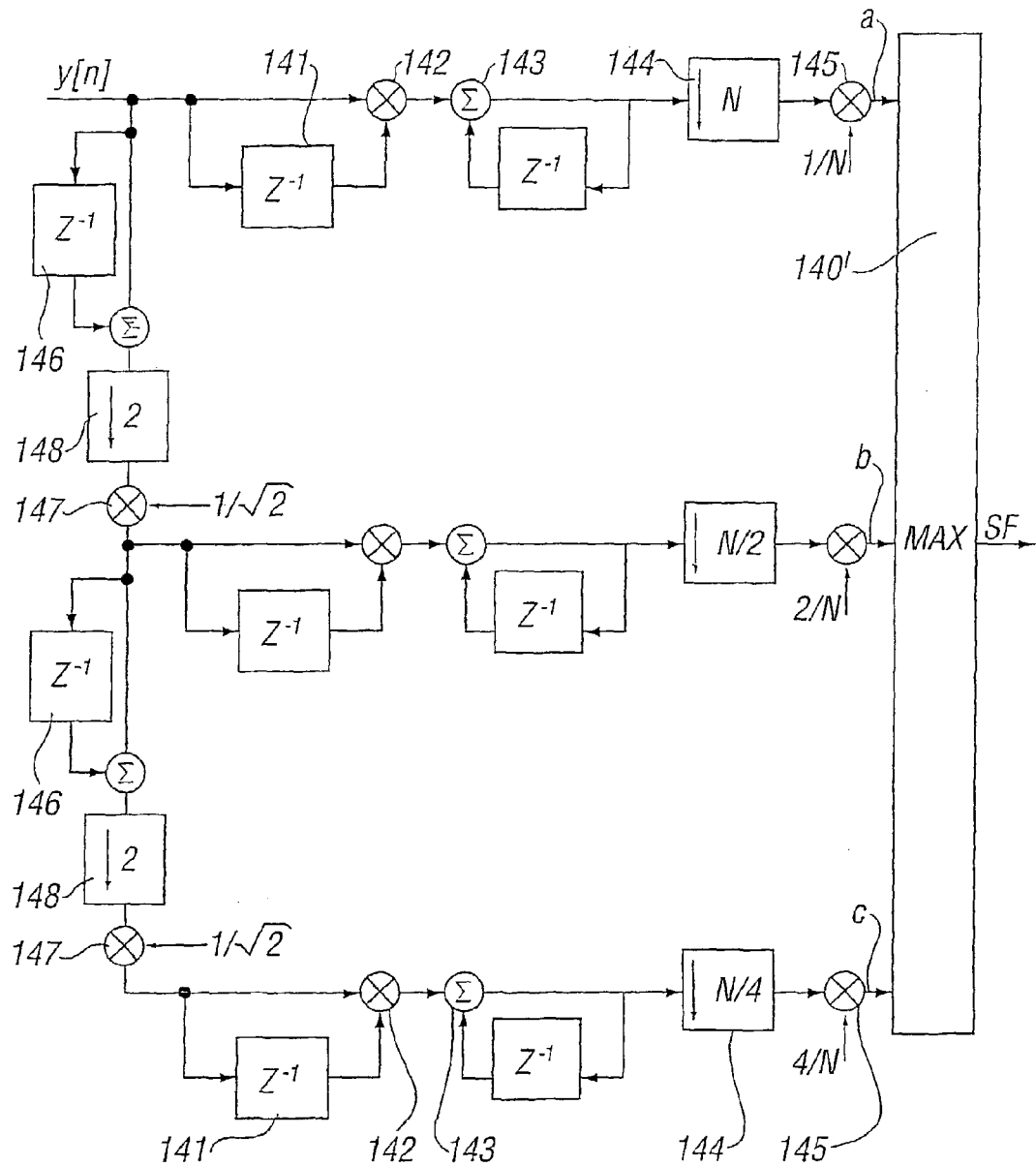
FIG. 4 shows an example of circuitry for determining the spreading factor.

Reference will now be made to FIG. 4 which shows an example of circuitry for determining the spreading factor.

The operation of an autocorrelation based spreading factor (SF) detector 140' may be based on a dedicated data channel frequency estimation. According to a possibility a maximal ratio combined (MRC) signal is firstly correlated with possible spreading codes using different spreading factors. It is noted that in this context the "correlation" refers to integration (i.e. despreading) and downsampling of the signal to the assumed data symbol rate by the spreading code so that the effects of the spreading code are removed from the signal. The correlation may also be accomplished before the combination. The term "autocorrelation" refers to computation of autocorrelation values that are computed for the outputs of a correlator performing the correlation of the signal. An autocorrelation function, such as one step autocorrelation function, is preferably calculated for each correlator output of the dedicated data channel. The spreading factor may then be determined based on the results of the autocorrelation computations.

According to a preferred embodiment the spreading factor can be defined based on the maximum value obtained by the computations. The selection of the maximum value is based on the founding that the maximum value is provided when the correlation slot is correct, i.e. when the data symbol under consideration becomes correlated wish a data symbol that correlates best with it. If the sampling slot is too short the data symbols cannot be properly correlated. Thus the correlator output value will be smaller than the possible maximum value since the correlation is "poorer" than what it would be with a correct-correlation slot. If the correlation slot is too long, the data symbols do not have any dependency or only a small dependency with each other and the average or expected output value will be zero or close to zero.

It is noted that instead of processing the signal by a correlation function, the effects of the spreading code may also be cleared from the signal by other appropriate means. An example of the other appropriate means is a matched filter and a subsequent sampling to a different data symbol rate.

The correlator output Y for time interval n may be obtained from equation $$y[n] = \frac{1}{\sqrt{G_0}} \mathrm{Re}\left[\sum_{l=1}^{L} \hat{c}_l \int_{t=n4T_c}^{(n+1)4T_c} r(t)s(t - n4T_c - \tau_l)dt\right] \quad (1)$$

In the above equation $G_0$=smallest possible spreading factor, L=the number of signal propagation paths (e.g. the number of RAKE branches), $\hat{c}_l^*$=complex conjugate of the channel estimate, $T_c$=chip duration, r=the received signal (in relation to time t), and $\tau_l$=the delay of the propagation path L in relation to the other propagation paths.

The division by $\sqrt{G_0}$ is included in (1) because of mathematical convenience. More particularly, it may be used since the noise terms are zero mean Gaussian random variables with an equal variance. It is noted that although the normalisation is preferred as it simplifies, the computations, the normalisation is not always necessary for the operation of the invention. In addition, the normalisation may be accomplished by means of other normalisation methods than the one described herein.

As the possible spreading factors are of the form $G_m=2^m G_0$, the correlator output for the $m^{th}$ spreading factor hypothesis $$y_m[n] = \frac{1}{\sqrt{G_m}} \sum_{n'=nG_m}^{(n+1)G_m-1} s*[n']r[n'] \quad (2)$$

(s=the overall spreading signal)
equals $$y_m[n] = \frac{1}{\sqrt{2^m}} \sum_{i=0}^{2^m-1} y[2^m n + i]; n = 0.1, \ldots, \frac{N}{2^m} - 1; \quad (3)$$

(N=the length of the observation window).

In other words, the output equals to y[n] that is correlated (summed and downsampled) by factor $2^m$.

The final decision rule can then be expressed as $$\hat{m} = \arg\max \Omega_c(m) \quad (4)$$

$$m \in 0.1 \ldots \backslash f-1 \quad (4)$$

wherein $$\Omega_c(m) = \frac{2^m}{N} \sum_{m=0}^{\frac{N}{2^m}-1} y_{m-1}[2n]y_{m-1}^*(2n+1). \quad (5)$$

The above procedure has been illustrated by FIG. 4, wherein the received signal y[n] is assumed to have three possible different spreading factors that are processed in respective calculation branches. In commutations for the correlator output the minimum spreading factor is assumed to be 4. To simplify the computations further, the assumed minimum spreading factor is divided by 2. In addition, the above discussed $\sqrt{G_0}=\sqrt{2}$ is used for the division of the signal sample. The maximum of the values produced by the three branches a to c is then selected at a block 40'. The spreading factor SF is determined based on this selection.

More particularly, a delay j that equals one sample is accomplished in each of the branches at 141 (i.e. in FIG. 4 and in the equation (5) j=1). The autocorrelation of the data symbols is accomplished in each of the branches at multipliers 142. Thereafter the results are averaged over N symbols at adders 143 by means of a recursive summing. The results are downsampled at blocks 144 by the number of samples (N) and divided by the number of samples at blocks 145 before the resulting values of the branches a to c are input in the selection block 140'. In the upmost branch a it is assumed that spreading factor is the smallest possible spreading factor. In the second (middle) branch b it is assumed that the spreading factor is twice the smallest possible spreading factor, and thus the sample is multiplied by $1/\sqrt{2}$ a at 147 between the subsequent branches. A recursive summing is accomplished between the branches at 146. In addition, the samples are downsampled by two at 148 between the branches (i.e. every other sample is ignored). The functions 146 and 148 provide in combination the correlation function referred to above. It is noted that the delay function provided at 147 may also be positioned otherwise than what is disclosed by FIG. 4. The blocks 144 and 145 in branches b and c are provided with factors 2 and 4, respectively in order to take the different number of samples (due to the downsampling between the branches at 148) into account.

The preferred embodiment of the invention has been described in the context of circuitry in a base station. It should be appreciated that the circuitry can also or alternatively be provided in a mobile station or any other type of user equipment which may be mobile or stationary.

It should be appreciated that other implementations of the spreading factor detector can be used in embodiments of the present invention.

Figure 5:
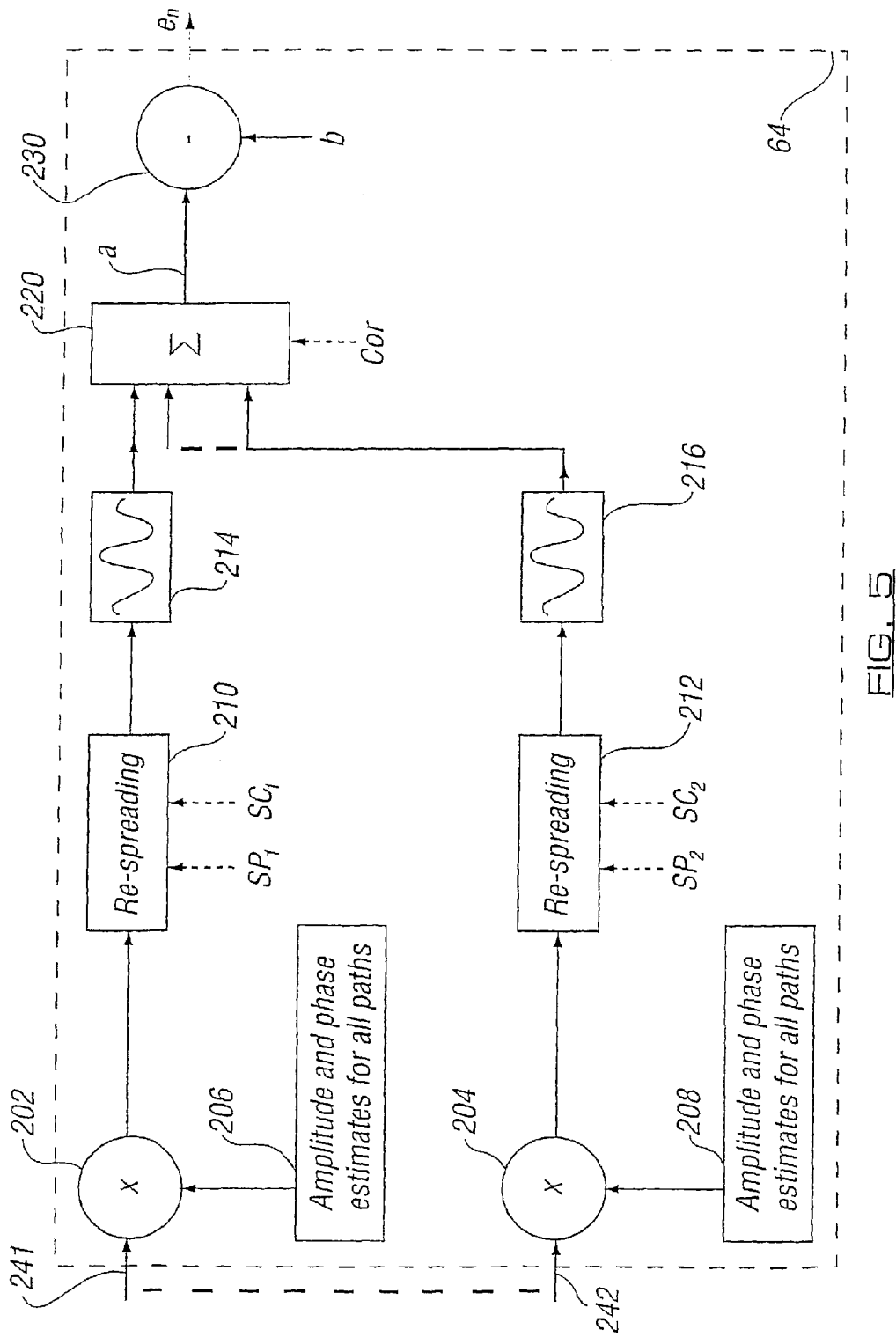
FIG. 5 shows the multi access interference estimation block of FIG. 2 in more detail.

FIG. 5 shows the multi access interference estimation block of FIG. 2 in more detail. First and second user branches are shown explicitly in the estimation block of FIG. 5. In practice the number of branches will depend for example on anticipated user numbers. Each branch comprises an input multiplier 202, 204 coupled to an amplitude and phase estimation block 206, 208, a re-spreading block 210, 212 and a pulse shaping filter 214, 216. The pulse shaping filter 214, 216 of each user branch is connected to a summation block 220 which is itself connected to a subtractor 230.

The inputs 241, 242 to the multi access interference estimation block 64 are from the demodulators 50 and 58 shown in FIG. 2. The inputs 241, 242 represent tentative hard decisions made by the demodulators 50, 58 using either known spreading factors or the smallest spreading factors. The multipliers 202, 204 multiply the inputs 241, 242 of the respective users by amplitude and phase estimates for each propagation path. If there are a number of different propagation paths in a channel, then there are L separate signals containing the same symbol after multiplication. The signals from the multipliers 202 and 204 are then respread at blocks 210 and 212 using the spreading $SP_1$, $SP_2$ and scrambling $SC_1$, $SC_2$ codes specific to the user in question. After respreading the signals are filtered by the pulse shaping filters 214 and 216.

The signal output from the filter 214 of the first user branch represents the re-generated wide band signal of user 1. The signal output from the filter 216 of the second user branch represents the re-generated wideband signal of user 2. The signals of the respective users 1 and 2 from the pulse shaping filters 214, 216 are aligned in the time dimension based on impulse response measurements and added together in the summation block 220.

Thus, in practice the inputs to the summation block 220 comprise a plurality of discrete regenerated signals, each corresponding to a different user. The output of the summation block 220 is a re-generated wideband signal including contribution from all of the users. In order to generate a multi access interference estimation for a particular user the regenerated signal of that user b is subtracted from the regenerated signal a which includes contributions from all users.

In general the purpose of the estimation unit is to regenerate the received signal so that the signal structure is the same as in a transmitter and the influence of a channel has been taken into account.

The preferred embodiments of the present invention have been described in the context of a wireless cellular telecommunications system. Embodiments of the present invention can used with any other type of wireless system. Some embodiments of the present invention can be used in wired systems or the like.

The invention claimed is:

1. A receiver comprising:
    means for receiving a plurality of spread spectrum signals, the plurality of spread spectrum signals including a first signal from which interference caused by a second signal of the plurality of spread spectrum signals is to be removed, wherein the second signal has a first spreading factor which is unknown to the receiver, and further wherein at least one of the plurality of spread spectrum signals has a second spreading factor which is known to the receiver;
    means for estimating the first spreading factor, wherein the estimating means is arranged to select a minimum spreading factor allowed for the second signal;
    means for despreading the second signal using said estimated first spreading factor; and
    means for estimating interference in the first signal caused by the second signal using the despreaded second signal.

2. A receiver as claimed in claim 1, further comprising means for at least partially canceling the interference caused by the second signal using the estimated interference.

3. A receiver as claimed in claim 1, wherein said receiver has a first path and a second path for received signals, said first path being used for each spread spectrum signal having a spreading factor which is unknown to the receiver and said second path being used for each spread spectrum signal having a spreading factor which is known to the receiver.

4. A receiver as claimed in claim 3, wherein switch means are provided for selecting said first path or said second path.

5. A receiver as claimed in claim 3, wherein said first path and said second path are connected to said means for estimating interference.

6. A receiver as claimed in claim 3, wherein said first path comprises said spreading factor estimating means and said despreading means.

7. A receiver as claimed in claim 1, wherein said estimating means is provided with a plurality of estimates for the first spreading factor and said estimating means for the first spreading factor is arranged to select the largest of said provided estimates.

8. A receiver as claimed in claim 1, further comprising a spreading factor detector configured to determine the first spreading factor based on the estimated first spreading factor, wherein the means for despreading the second signal uses the determined first spreading factor.

9. A receiver as claimed in claim 8, wherein said spreading factor detector determines a correlation output for a plurality of spreading factor hypotheses.

10. A receiver as claimed in claim 9, wherein the first spreading factor is determined as the spreading factor hypothesis associated with the maximum determined correlation output.

11. A receiver as claimed in claim 1, wherein a plurality of different spreading factors are available and said estimating means for the first spreading factor selects the smallest spreading factor which can be used by the sender of said signals.

12. A receiver as claimed in claim 1, wherein the estimating means for the first spreading factor is arranged to select the smallest spreading factor possible for signals in a communication system from which the plurality of spread spectrum signals are received.

13. A receiver as claimed in claim 1, wherein said receiver is used in a wireless communications system.

14. A receiver as claimed in claim 13, wherein said receiver is incorporated in a base station and/or user equipment.

15. A receiver as claimed in claim 1, wherein said receiver is arranged to receive code division multiple access signals.

16. A method for estimating interference in a spread spectrum signal from a plurality of spread spectrum signals, said method comprising:
receiving a plurality of spread spectrum signals at a receiver, the plurality of spread spectrum signals including a first signal from which interference caused by a second signal of the plurality of spread spectrum signals is to be removed, wherein the second signal has a first spreading factor which is unknown to the receiver, and further wherein at least one of the plurality of spread spectrum signals has a second spreading factor which is known to the receiver;
estimating the first spreading factor at the receiver, wherein said estimating the first spreading factor includes selecting a minimum spreading factor allowed for the second signal;
despreading the second signal using said estimated first spreading factor at the receiver; and
estimating interference in the first signal caused by the second signal using the despreaded second signal at the receiver.

17. A method as claimed in claim 16, further comprising at least partially canceling the interference caused by the second signal using the estimated interference.

18. The method of claim 16, wherein said receiver has a first path and a second path for received signals, said first path being used for each spread spectrum signal having a spreading factor which is unknown to the receiver and said second path being used for each spread spectrum signal having a spreading factor which is known to the receiver.

19. The method of claim 16, wherein the estimated first spreading factor is selected as a largest of a plurality of provided estimates.

20. The method of claim 16, further comprising determining the first spreading factor based on the estimated first spreading factor, wherein the step of despreading the second signal uses the determined first spreading factor.

21. The method of claim 20, further comprising determining a correlation output for a plurality of spreading factor hypotheses.

22. The method of claim 21, wherein the first spreading factor is determined as the spreading factor hypothesis associated with the maximum determined correlation output.

23. The method of claim 16, wherein the minimum spreading factor allowed comprises a minimum spreading factor for a system associated with the receiver.

24. The method of claim 16, wherein the minimum spreading factor allowed comprises a minimum spreading factor allowed by a radio network controller for a particular data frame.

25. The method of claim 16, wherein the minimum spreading factor allowed comprises a minimum possible spreading factor as determined by a spreading factor detector of the receiver.

26. The method of claim 16, wherein the minimum spreading factor allowed for the second signal comprises a largest of:
a minimum spreading factor for a system associated with the receiver;
a minimum spreading factor allowed by a radio network controller for a particular data frame; and
a minimum possible spreading factor as determined by a spreading factor detector of the receiver.

27. The method of claim 16, wherein the plurality of spread spectrum signals are received wirelessly from a transmitting device, and wherein the estimating the first spreading factor comprises selecting a minimum spreading factor allowed for the second signal, and wherein the second signal is received wirelessly from the transmitting device and has a spreading factor unknown to the receiver.

28. A receiver comprising:
an antenna configured to receive a plurality of spread spectrum signals, the plurality of spread spectrum signals including a first signal from which interference caused by a second signal of the plurality of spread spectrum signals is to be removed, wherein the second signal has a first spreading factor which is unknown to the receiver, and further wherein at least one of the plurality of spread spectrum signals has a second spreading factor which is known to the receiver;
a spreading factor unit configured to estimate the first spreading factor by selecting a minimum spreading factor allowed for the second signal and to despread the second signal using said estimated first spreading factor; and
a multiple access interference estimator configured to estimate interference in the first signal caused by the second signal using the despreaded second signal.

29. The receiver of claim 28, wherein said receiver has a first path and a second path for received signals, said first path being used for each spread spectrum signal having a spreading factor which is unknown to the receiver and said second path being used for each spread spectrum signal having a spreading factor which is known to the receiver.

30. The receiver of claim 28, wherein the estimated first spreading factor is selected as a largest of a plurality of provided estimates.

31. The receiver of claim 28, further comprising a spreading factor detector configured to determine the first spreading factor based on the estimated first spreading factor, wherein the means for despreading the second signal uses the determined first spreading factor.

32. The receiver of claim 31, wherein the spreading factor detector is further configured to determine a correlation output for a plurality of spreading factor hypotheses.

33. The receiver of claim 32, wherein the first spreading factor is determined as the spreading factor hypothesis associated with the maximum determined correlation output.

34. A non-transitory tangible computer-readable medium having stored thereon, computer-executable instructions that, if executed by a computing device, cause the computing device to perform a method comprising:

receiving a plurality of spread spectrum signals, the plurality of spread spectrum signals including a first signal from which interference caused by a second signal of the plurality of spread spectrum signals is to be removed, wherein the second signal has a first spreading factor which is unknown to the receiver, and further wherein at least one of the plurality of spread spectrum signals has a second spreading factor which is known to the receiver;

estimating the first spreading factor by selecting a minimum spreading factor allowed for the second signal;

despreading the second signal using said estimated first spreading factor; and estimating interference in the first signal caused by the second signal using the despreaded second signal.

35. A non-transitory tangible computer-readable medium of claim 34, wherein the computer-executable instructions, if executed by the computing device, further cause the computing device to perform a method comprising at least partially canceling the interference caused by the second signal using the estimated interference.

* * * * *

UNITED STATES PATENT AND TRADEMARK OFFICE
CERTIFICATE OF CORRECTION

PATENT NO. : 8,102,899 B2
APPLICATION NO. : 10/332040
DATED : January 24, 2012
INVENTOR(S) : Juntti et al.

It is certified that error appears in the above-identified patent and that said Letters Patent is hereby corrected as shown below:

Title Page 2, Item (56), under "Other Publications", in Column 2, Line 9, delete "IEE," and insert -- IEEE, --.

Title Page 2, item (56), under "Other Publications", in Column 2, Line 16, delete "Xp002180037 199," and insert -- XP002180037, --.

Column 11, line 54, in Claim 17, delete "A method as claimed in claim" and insert -- The method of claim --.

Signed and Sealed this
Tenth Day of July, 2012

David J. Kappos
*Director of the United States Patent and Trademark Office*